US012800377B2

(12) United States Patent
Timis et al.

(10) Patent No.: US 12,800,377 B2
(45) Date of Patent: Nov. 17, 2026

(54) GAS METER

(71) Applicant: PIETRO FIORENTINI S.p.A., Arcugnano (IT)

(72) Inventors: Gabriel Timis, Rosate (IT); Mario Vianello, Rosate (IT); Marcello Ghidina, Rosate (IT); Michele Carlet, Rosate (IT); Lorenzo Memè, Rosate (IT)

(73) Assignee: PIETRO FIORENTINI S.p.A., Arcugnano (IT)

( * ) Notice: Subject to any disclaimer, the term of this patent is extended or adjusted under 35 U.S.C. 154(b) by 339 days.

(21) Appl. No.: 18/293,790

(22) PCT Filed: Aug. 3, 2022

(86) PCT No.: PCT/IB2022/057211
§ 371 (c)(1),
(2) Date: Jan. 31, 2024

(87) PCT Pub. No.: WO2023/012692
PCT Pub. Date: Feb. 9, 2023

(65) Prior Publication Data

US 2024/0247962 A1 Jul. 25, 2024

(30) Foreign Application Priority Data

Aug. 5, 2021 (IT) ........................ 102021000021254

(51) Int. Cl.
*G01F 15/14* (2006.01)
*G01F 1/66* (2022.01)

(52) U.S. Cl.
CPC .............. *G01F 15/14* (2013.01); *G01F 1/662* (2013.01)

(58) Field of Classification Search
None
See application file for complete search history.

(56) References Cited

U.S. PATENT DOCUMENTS 5,220,830 A 6/1993 Bonne
10,514,286 B2 * 12/2019 Morihana ............... G01F 1/667
(Continued)

FOREIGN PATENT DOCUMENTS

CN 207423297 U 5/2018
EP 2698189 A1 2/2014

*Primary Examiner* — Mark A Shabman
(74) *Attorney, Agent, or Firm* — Carmel Patent Agency; Robert Ballarini

(57) ABSTRACT

A gas meter includes: a containment casing defining a gas inlet therein and an outlet for the exit of gas therefrom; a detection module housed inside the casing which is configured to detect one or more parameters relating to gas entering; first second zones defined inside the casing, the first zone in fluid communication with the inlet second zone in fluid communication with the inlet of the detection module, the fluidic connection between the first and second zones occurring exclusively through at least one passage having filtration means. The filtration means having a filter element mounted on separation means which separate first and second zones. The filter element is made of material different from that with which said separation means are made. The separation means include at least two mounting elements configured to be mechanically bonded to each other in a removable manner.

20 Claims, 10 Drawing Sheets

(56) References Cited

U.S. PATENT DOCUMENTS

| | | | | |
|---|---|---|---|---|
| 2007/0107396 | A1 | 5/2007 | Zuberi | |
| 2013/0312638 | A1* | 11/2013 | Parker | A61B 17/00234 264/211.1 |
| 2016/0109274 | A1* | 4/2016 | Berger | G01F 1/662 73/198 |
| 2016/0320218 | A1* | 11/2016 | Morihana | G01F 15/185 |
| 2021/0231481 | A1 | 7/2021 | Vianello et al. | |
| 2022/0146298 | A1* | 5/2022 | Meimberg | G01F 15/005 |

* cited by examiner

GAS METER

FIELD OF THE TECHNIQUE

The present invention relates to a gas meter.

BACKGROUND OF THE INVENTION

Static type gas meters which do not have moving parts are known and widespread today. Such known gas meters generally comprise:

- a containment structure which is defined by a box-like body or metal enclosure,
- an inlet and an outlet, defined on the box-shaped body, for the passage of a flow of gas inside the box-shaped body itself,
- a shut-off valve for the gas flow passing through that gas meter,
- a module for the detection of one or more parameters for determining the gas flow rate,
- filtration media for the gas flow.

The detection module includes, inside, one or more sensors able to detect one or more quantities useful for direct or indirect measurement, or by processing the detected data, of the gas flow. Conveniently, a communication module is also provided for transmitting the detected data, preferably via wireless, to an electronic control unit located outside the measurement unit.

Nowadays, in the gas meters sector the need is increasingly felt to have solutions in which the fouling of the sensor, or sensors, which operate inside the flow detection module, is reduced to a minimum and preferably eliminated, in order to keep the detection error curve within the limits required by the regulations in force throughout the life of the meter.

Gas meters are known today which, in order to retain the dust contained in the gas flow coming from the network, are provided with filtration means which are generally based on the principle of static electricity and/or on the principle of mechanical retention.

In these filtration media, the dust contained in the gas is retained by a cloth, before the gas flow enters the detection module in which the measurement is carried out.

However, this solution has an intrinsic limitation. In fact, once the upper layer of the cloth has been completely saturated with powders, dust retention is no longer guaranteed.

In these known filtration means, the path of the gas entering the gas meter provides that the gas flow enters from an inlet fitting, is deflected by 90° and breaks against a flow diverter barrier, consisting of a cloth which traps the debris contained in the gas; meanwhile, the larger and heavier particles settle on the bottom of the box-like body of the gas meter, while the main gas flow, consisting of the lighter particles, is diverted in such a way as to leave the diverter barrier through a passage between it and the bottom of the box-like body of the gas meter, to then enter the controlled volume of the detection module.

When the diverter barrier cloth is no longer able to retain the dust suspended in the gas flow, these dust remain in the gas flow, thus dirtying the detection module which, inside the box-like body, is placed at downstream of the filtration media.

Furthermore, the gas flow, diverted so as to flow through a passage so as to lick the bottom of the box-shaped body, risks carrying with it part of the heavier particles which have deposited by gravity on the bottom of the box-shaped body.

Another limitation of known gas meters is constituted by the fact that the shut-off valve, generally defined by a solenoid valve, if present, is often positioned in correspondence with the meter inlet; in this position the solenoid valve is therefore subject to the flow of dust contained in the gas coming from the network.

Before the valve there may be a mechanical filter, for example of the metal mesh type, configured to retain the powders of larger dimensions but, once this filter is saturated, even partially, the finer powders still descend by gravity to the inside the solenoid valve, jeopardizing its long-term operation.

Furthermore, as the filter becomes saturated, its resistance to the flow of gas increases and, consequently, the pressure difference between the distribution network upstream of the meter and the outlet of the same increases, with consequent undesired modification of the fluid dynamic conditions inside the gas meter.

Furthermore, the powders are not collected in a limited volume and are continuously invested by the main gas flow before it enters the solenoid valve which, therefore, ends up collecting the majority of it.

The need is also increasingly felt in the sector to make gas meters safe against tampering attempts.

In particular, gas meters are known today which comprise a box-like body having an inlet and an outlet, both facing upwards with respect to a normal use of the gas meter. More in detail, generally, inside the box-shaped body there may be present—in the order in which the gas flow is crossed—a mechanical filter, in correspondence with the inlet, a flow shut-off solenoid valve and a detection module one or more parameters for determining the gas flow rate.

In such known gas meters, the detection module is mechanically and fluidically connected directly to the outlet fitting and is arranged contiguously with this outlet fitting. This mounting position of the measuring module inside the box-like body lends itself to easy tampering with the detection module, since it is not currently required by the standards that the outlet fitting is sealed. Even in the presence of a protective mesh filter between the detection module and the outlet fitting, this solution does not appear effective in the event of tampering attempts such as for example the release of the detection module, the obfuscation of one or more sensors present. in the detection module, the damage of the latter with compressed air, and the like.

US2021231481 discloses a gas meter comprising a containment body with a mouth for the entry of the gas inside the containment body and a mouth for the exit of the gas from the containment body; inside the containment body there are housed a measuring device suitable for detecting one or more parameters for determining the gas flow rate, and a filter suitable for filtering the gas flow. In particular, the filter comprises a chamber for depositing the dust present in the incoming gas, and in which the dust depositing chamber is in communication with the inlet port of the containment body and comprises a dust collection base and a wall filter outlet equipped with through openings.

OBJECTIVES OF THE INVENTION

The object of the invention is to propose a gas meter which allows to overcome, at least in part, the drawbacks and limitations of traditional solutions.

Another object of the invention is to propose a gas meter in which various types of detection modules can be used, even those already available on the market, and this without compromising the metrological performance of the meter itself over time.

Another object of the invention is to propose a gas meter which effectively separates the dust contained in the gas before they enter the detection module and/or the shut-off valve housed inside the meter.

Another object of the invention is to propose a gas meter in which the detection module and the shut-off valve are more protected from the dust contained in the mains gas which enters the meter itself.

Another object of the invention is to propose a gas meter that is safer with respect to the risks of tampering.

Another object of the invention is to propose a gas meter with a performance that is not inferior to known gas meters.

Another object of the invention is to propose a gas meter which is easy and quick to maintain, as well as inexpensive.

Another object of the invention is to propose a gas meter which can be obtained simply, quickly and with low costs.

Another object of the invention is to propose a gas meter which is in line with the regulations in force in the sector.

Another object of the invention is to propose a gas meter which allows a precise and reliable measurement, even over time, of the gas that passes through it.

Another object of the invention is to propose a gas meter which is highly safe and reliable.

Another object of the invention is to propose a gas meter which is an improvement and/or alternative to the traditional ones.

Another object of the invention is to propose a gas meter which presents an alternative characterization, both in constructive and functional terms, with respect to the traditional ones.

SUMMARY OF THE INVENTION

All the purposes mentioned herein, considered both individually and in any combination thereof, and others still which will result from the following description, are achieved, according to the invention, with a gas meter as defined in claim 1.

DESCRIPTION OF THE FIGURES

The present invention is further clarified hereinafter in some of its preferred embodiments reported for purely illustrative and non-limiting purposes with reference to the attached drawings, in which:

FIG. 11 shows a perspective exploded view of a filtration device housed in the meter of FIG. 8.

DETAILED DESCRIPTION OF THE INVENTION AND OF SOME OF ITS PREFERRED EMBODIMENTS

Figure 1:
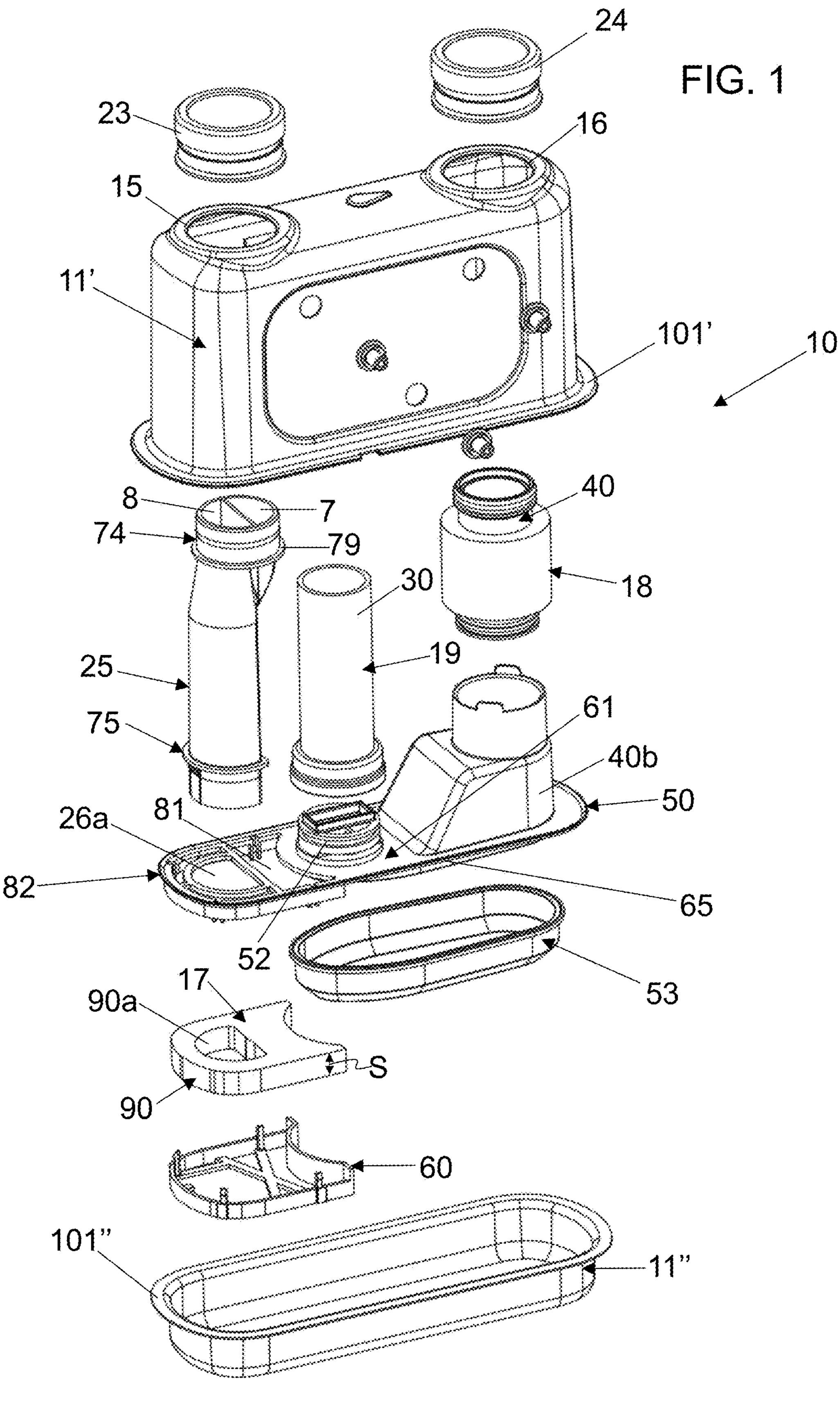
FIG. 1 shows a perspective exploded view of the gas meter according to invention.
Figure 2:
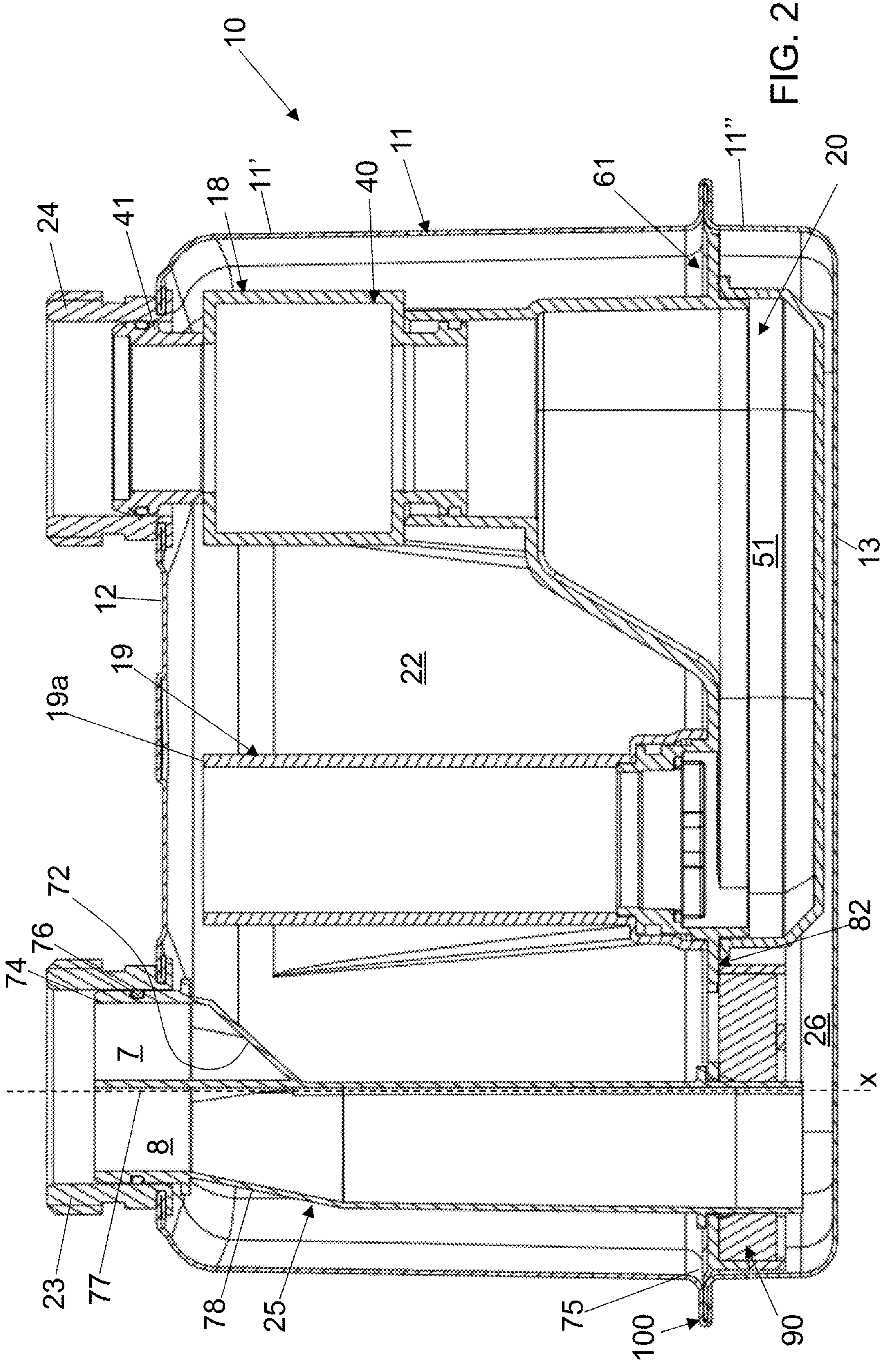
FIG. 2 shows a sectional side view of the meter of FIG. 1.
Figure 3:
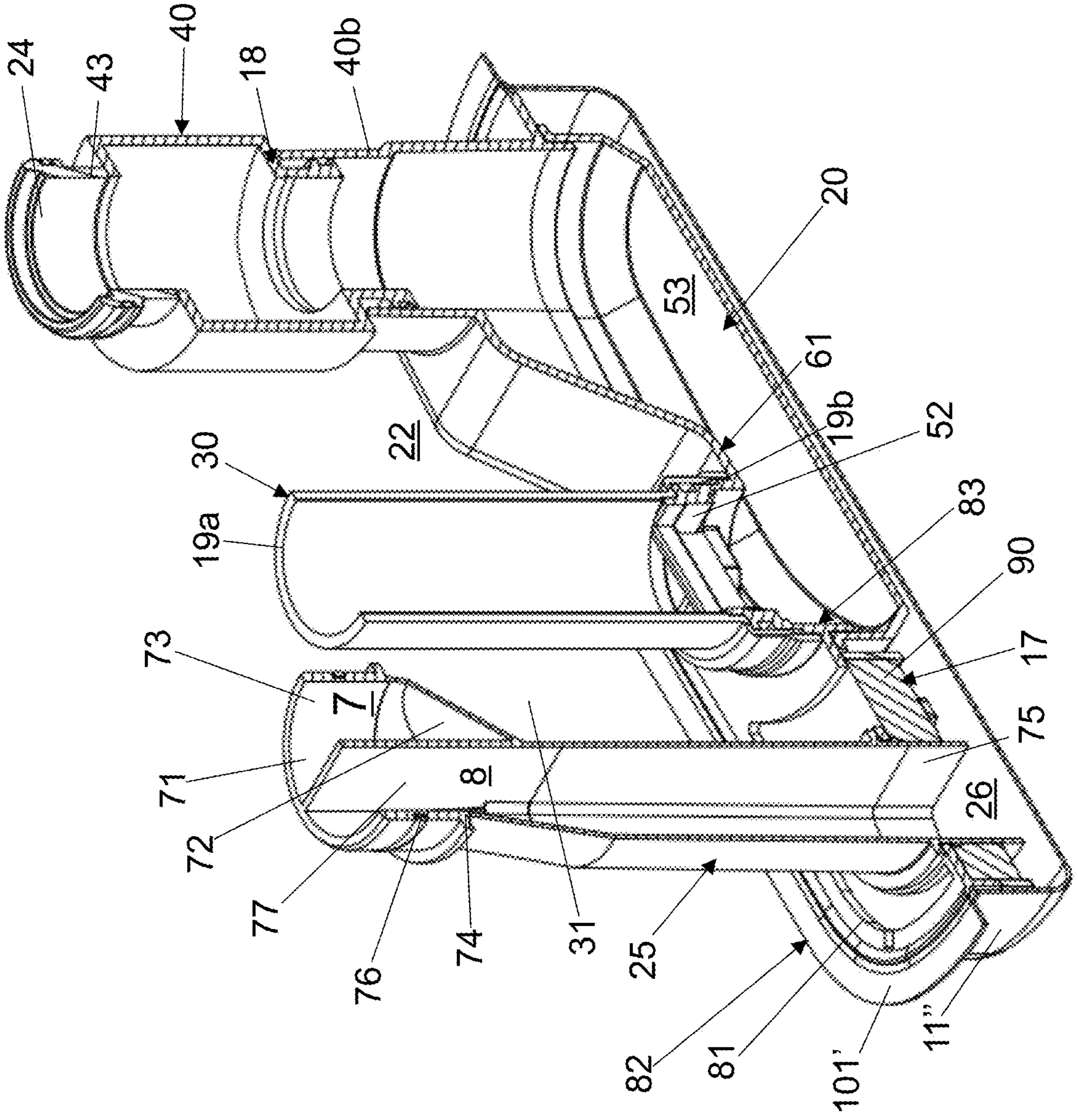
FIG. 3 shows a perspective section of the meter of FIG. 1 without a part of the containment structure.
Figure 4C:
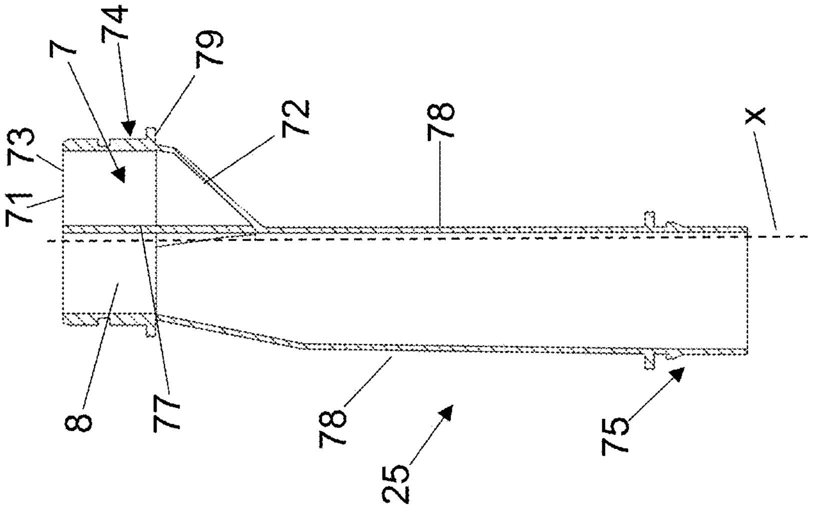
FIG. 4*c* shows a side view of a longitudinal section of the inlet duct of FIG. 4*a*.
Figure 4A:
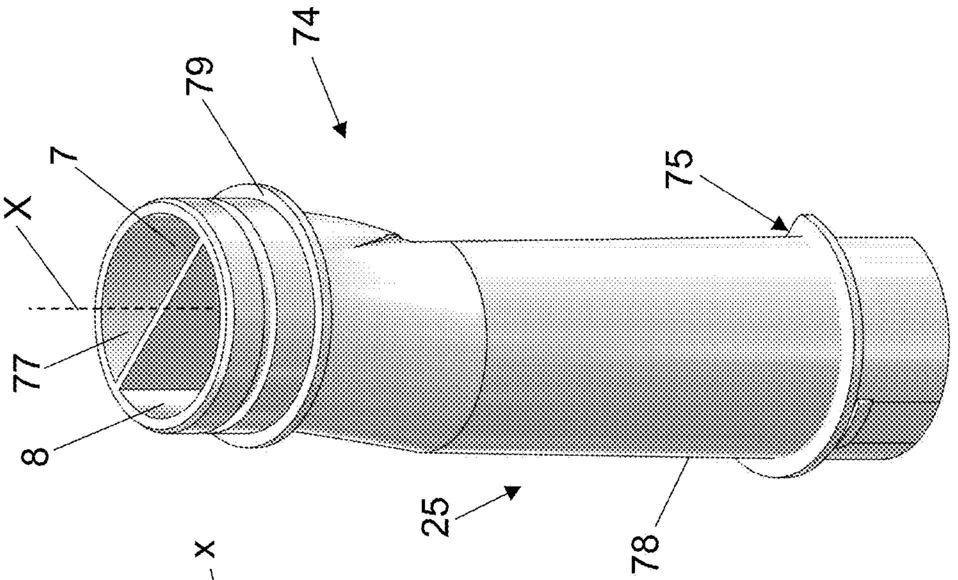
FIG. 4*a* shows in perspective view the inlet duct provided in the meter of FIG. 1.
Figure 4B:
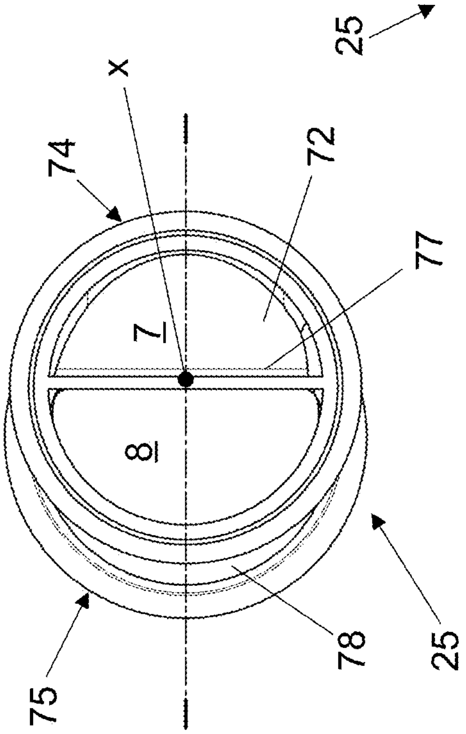
FIG. 4*b* shows a view from the other side of the inlet duct of FIG. 4*a*.

With reference to the cited figures, the present invention relates to a gas meter which is indicated as a whole with the number 10.

The gas meter 10 comprises:

a containment casing 11, an inlet 15 and an outlet 16 for the passage of a flow of gas, respectively entering the meter 10 and leaving the meter 10.

Conveniently, the inlet 15 and outlet 16 are obtained on the containment casing 11.

Conveniently, the containment casing 11 is watertight to prevent the escape of gas to the outside. Preferably, the containment casing 11 is formed by two or more parts 11' and 11' joined together so as to ensure the hermetic sealing of the entire envelope. Preferably, the containment casing 11 is made of metal, in particular of metal sheet.

Inside the containment casing 11 of the meter 10 there is a module 19 for detecting one or more parameters of the gas, in particular for detecting one or more parameters for determining the flow rate of the gas that enters/passes through the meter. same.

Conveniently, inside the containment casing 11 of the meter 10 there is also housed an shut-off valve 18 of the gas flow that passes through the meter 10. Preferably, the shut-off valve 18 is a solenoid valve. Preferably, as shown in the figures, the shut-off valve 18 is positioned in correspondence with the outlet port 16. Conveniently, the shut-off valve 18 is mounted at the inlet and/or outlet and/or is crossed by an outlet duct. 40.

Conveniently, the gas meter 10 comprises, at its inlet 15, an inlet fitting 23. Conveniently, the inlet fitting 23 is fixed (if it is made in a separate piece) and/or integrated (if it is made in a single piece with the corresponding part 11') to the casing 11 in correspondence with the inlet 15 of the casing itself. Preferably, in a possible embodiment, the inlet fitting 23 is provided with an externally threaded portion to thus allow its screwing into a corresponding internal thread provided at the inlet 15 of the containment casing 11.

Conveniently, the gas meter 10 comprises, at its outlet 16, an outlet fitting 24. Conveniently, the outlet fitting 24 is fixed (if it is made in a separate piece) and/or integrated (if it is made in a separate piece) single piece with the corresponding part 11') to the casing 11 at the outlet 16 of the casing itself. Preferably, the outlet fitting 24 is provided with an externally threaded portion to thus allow its screwing into a corresponding internal thread provided at the outlet port 16 of the containment casing 11.

Conveniently, inside the containment casing 11 of the meter 10 also houses filtration means 17 for the flow of gas.

The meter 10 comprises a first zone 26 and a second zone 22 which are entirely defined inside the containment casing 11. Conveniently, the flow of gas entering the meter first passes through the first zone 26 and subsequently the second zone 22 and therefore, considering the gas flow inside the meter, the second zone 22 is defined downstream with respect to the first zone 26.

Conveniently, the first zone 26 and the second zone 22 are defined inside the containment casing 11 so that:

- the first zone 26 is in fluid communication with the inlet 15, in particular by means of the inlet duct 25,
- the second zone 22 is in fluid communication with the measuring module 19, and in such a way that the fluidic connection between said first zone 26 and said second zone 22 occurs exclusively through a passage 81 comprising filtration means 17.

Conveniently, inside'containment casing 11 separation means are provided which separate the first zone 26 and the second zone 22 from each other.

Conveniently, in a possible embodiment (see FIGS. 1-7), the separation means can comprise an element of separation element 82 with a lower frame 60 which is configured to mechanically engage in a removable way, preferably interlocking or snap-on, on the separation element 82.

Conveniently, in a possible embodiment (see FIGS. 8-12), the separation means may comprise a separation structure 91 with a protruding body 92, box-shaped, and with a frame 93 which is configured to mechanically engage in mod or removable, preferably by interlocking or snapping, on the protruding body 92.

Conveniently, the filtration means 17 comprise at least one filter element 90 which is mounted on said separation means which separate the first zone 26 and the second zone 22.

Conveniently, said at least one filter element 90 is mounted on said separation means and is made of a different material than that with which said separation means are made.

Conveniently, the separation means comprise at least two mounting elements—for example defined by the separation element 82 with the lower frame 60, or by the protruding body 92 with the frame 93—which are configured to be mechanically constrained to each other in a removable way. Furthermore, said filter element 90 is a filter mat which is positioned and/or retained, preferably in a removable way, between said at least two mounting elements—for example defined by the separation element 82 and the lower frame 60, or by the frame 93 and from the protruding body 92—when they are mechanically linked together.

Preferably, in a possible embodiment, the entire internal volume of the containment casing 11 is divided into a first zone 26 and a second zone 22 by a separation element 82 on which filtration means 17 are mounted and/or obtained.

Preferably, the separation element 82 is interposed between two opposite walls 12 and 13 of the containment casing 11. Preferably, the first zone 26 and the second zone 22 are superimposed and are separated from each other by an separation element 82 on which at least one filter element 90 is mounted. More in detail, the first zone 26 can be delimited by the separation element 82, by the bottom wall 13 of the casing 11 and by the side walls of the containment casing 11 defined between the separation element 82 and the bottom wall 13 of the casing; the second zone 27 can be delimited by the separation element 82, by the upper wall 12 (ie the opposite wall with respect to the bottom one 13) of the casing 11 and by the side walls of the containment casing 11 defined between the separation element 82 and the upper wall of the casing 11.

Conveniently, the separation element 82 can be mounted and/or supported at the junction area between the two parts 11' and 11' which, once mutually joined at the flanged edges, define the containment casing 11. Preferably, the separation element 82 is mounted by means of sealing means (such as for example a sealing substance and/or a gasket) at the junction area 100 between the two parts 11' and 11" which define the containment casing 11.

Conveniently, the two parts 11' and 11" define two shells of different height but configured to be in contact with each other at the respective flanged edges 101' and 101". Conveniently, the flanged edges can be fixed to each other by welding and/or by means of an adhesive and/or by folding one over the other and/or by means of screws 121. Conveniently, between the flanged edges 101' and 101", respectively of the parts 11' and 11", a gasket element 120 can be interposed.

Preferably, the inlet port 15 is formed on the upper wall 12 of the casing 11.

Conveniently, it is understood that the inlet 15 and the outlet 16 can both be made on another same wall other than the upper wall 12. It is to be understood that the inlet 15 and the outlet 16 can each be made on a respective wall of the containment casing 11, different from the wall on which the other mouth is made.

Preferably, in a possible embodiment, the first zone 26 is defined inside the casing 11 on the opposite side to that in which the inlet 15 and/or outlet 16 are formed.

Conveniently, the first zone 26 is in fluid communication with the inlet fitting 23 by means of an inlet duct 25. Conveniently, the inlet duct 25 passes through—at least in part—the second zone 22.

The second zone 22 communicates with the first zone 26 only by means of at least one passage 81 comprising filtration means 17. In particular, the first zone 26 is configured in such a way that the gas flow enters it only through the inlet duct 25 and from here exits towards the second zone 22 only through at least one passage 81 which is provided with filtration means 17.

The inlet of the detection module 19 is in fluid communication with the second zone 22. The detection module 19 and the shut-off valve 18 are housed inside the second zone 22.

As mentioned, the gas meter 10 comprises an inlet duct 25 which is also housed entirely inside the casing 11. Conveniently, the inlet duct 25 is configured to be fluidically sealed, preferably by means of the inlet fitting 23, with a gas inlet duct (not shown) external to the meter 10. Conveniently, the inlet duct 25 is configured to receive and be traversed by all the gas which is intended to enter inside the containment casing 11.

In particular, the inlet duct 25 extends longitudinally along a direction X.

The inlet duct 25 is configured to pass through the inlet 15 and to fit tightly inside the inlet fitting 23. In particular, the inlet duct 25 passes through the inlet port 15 and extends towards an opposite wall, ie the bottom wall 13, of the containment casing 11.

In particular, the inlet duct 25 comprises an inlet section 74 which fits tightly within the inlet fitting 23. Conveniently, the inlet section 74 is configured to engage in shape relationship within the inlet fitting 23 Advantageously, moreover, on the external walls of the inlet section 74 there is mounted a gasket 76, preferably an O-ring, which is intended to be compressed by the internal walls of the inlet fitting 23 when the inlet section 74 is inserted inside. of the fitting itself. Conveniently, for this purpose, a seat, for example a circumferential groove, and/or a circumferential flange, can be provided on the external walls of the inlet section 74 to keep the gasket 76 in position.

Advantageously, in correspondence with the inlet section 74, the inlet duct 25 can be provided, underneath the gasket 76, with a flange 79 to ensure a block in the event of a possible release of the inlet duct from the inlet fitting 23 and, moreover, it advantageously acts as a reference for the assembly of the inlet duct in the inlet fitting 23 to prevent the first from entering too much inside the second.

The inlet duct 25 also comprises an outlet section 75—which is opposite to the inlet section 74—which enters the first zone 26 through a hole 26*a* defined on a separation element 82 which divides the first zone 26 from the second zone 22. Conveniently, the outlet section 75 protrudes, at least in part, inside the first zone 26.

Conveniently, the inlet section 74 and the outlet section 75 are defined at two opposite ends of the inlet duct 25, in particular of two ends which are opposite each other along the longitudinal extension X of the inlet duct 25.

Therefore, suitably, the inlet duct 25 is in fluidic connection, in correspondence with its inlet section 74, with the inlet of the gas inside the meter 11 and, in correspondence with its outlet section 75, is in direct or indirect communication (ie through a further chamber 80, as described below). with the first zone 26.

Conveniently, the inlet duct 25 comprises an elongated body which is internally hollow to thus allow the gas to pass through. Preferably, the inlet duct 25 is made in a single piece. Conveniently, the inlet duct 25 is made of polymeric material, preferably by molding.

Conveniently, the inlet duct 25 has a cross section that varies in terms of shape and size along its longitudinal extension X, in particular the cross section provided at the inlet section 74 is different from that of the central section and/or of the outlet section 75 of the duct itself.

Conveniently, the cross section of the inlet section 74 of the inlet duct 25 is circular or substantially circular.

Conveniently, the cross section of the outlet section 75 of the inlet duct 25 is semi-circular or substantially semi-circular (for example, slightly elongated semicircular).

In a possible embodiment, the cross section of the inlet section 74 of the inlet duct 25 can define a passage area greater than that of the cross section of the outlet section 75 of the duct itself.

Conveniently, in another possible embodiment, the section of the inlet section 74 of the inlet duct 25 can define a passage area that is smaller than that of the section of the outlet section 75 of the duct itself. Advantageously, the inlet duct 25 can have a substantially flared longitudinal development that goes from the inlet section 74 towards the outlet section 75.

Conveniently, mechanical engagement means, preferably snap-fit or snap-fit, are provided in correspondence with the outlet section 75, with the edges of the hole 26*a* of a separation element 82 which, in fact, separates the first zone 26 and the second zone 22 from each other defined inside the containment casing 11.

The inlet duct 25 comprises inside at least one gas passage channel 7 with at least one bottom 72 which is closed/blind so that the dust of the gas entering said channel is deposited on the bottom 72 of said channel. Conveniently, the outlet of the channel 7 faces or is angled/lateral with respect to the bottom 72 so that the outgoing gas flow is diverted from the bottom itself.

Preferably, each channel 7 defined inside the inlet duct 25 is configured so that the gas flow exiting the channel is deviated from the bottom 72 of the channel itself by an angle equal to or less than about 180°, with respect to the direction of the flow. of incoming gas, to thus generate a movement of the gas flow in countercurrent inside the duct itself.

Conveniently, the longitudinal development direction of the channel 7 is substantially corresponding to/parallel to the longitudinal development direction X of the inlet duct 25 and, therefore, the gas flow entering and passing through the channel 7 is parallel to the gas flow entering and passes through the remaining part of the inlet duct 25.

Conveniently, the inlet duct 25 comprises inside at least one dividing element 77, preferably a wall, to thus laterally delimit, at least in part, the channel 7. Preferably, the dividing element 77 of each channel 7 is integrated with external walls 78 in the inlet duct 25 and are molded in a single piece. Preferably, the dividing elements 77 are defined by extension walls which develop substantially parallel to the longitudinal development direction of the inlet duct 25.

Preferably, the bottom 72 of each channel 7 is defined by a solid base (ie without openings or through holes) which is arranged angled inside the inlet duct 25, ie defines an angle of about 45-90° with respect to the longitudinal development direction X of the inlet duct 25. Preferably, the bottom 72 of each channel 7 is integrated with the external walls 78 of the inlet duct 25 and are molded in one piece. Preferably, the bottom 72 can be defined by recesses in the external walls 78 of the inlet duct 25 and/or by transverse extensions of the dividing elements 77.

Conveniently, in a possible embodiment (see FIG. 9*c*), the channel 7 comprises inside it one or more shoulders 70 placed at a lower depth/height than the bottom 72 of the same channel.

Preferably, the dividing element 77 and the bottom 72 of each channel 7 are integrated with the external walls 78 of the inlet duct 25 and are molded in a single piece.

Conveniently, at least one channel 7 can be delimited below by the bottom 72 and laterally by the dividing element 77 and also by the external walls 78 of the inlet duct 25. Conveniently, in a possible variant embodiment, at least one channel 7 can be delimited below by the bottom 72 and laterally only by a dividing element 77.

Preferably, the opening 71 for the gas inlet into the channel 7 (hereinafter defined as "inlet opening 71") faces the bottom 72.

Conveniently, in a possible form of embodiment, the opening 73 for the gas outlet from channel 7 (hereinafter defined as "outlet opening 73") is also facing or aligned with the bottom 72 and, preferably, coincides with the inlet opening 71.

Conveniently, in a possible embodiment, the outlet opening 73 is made on a side wall that delimits the channel 7. Preferably, the outlet opening 73 is positioned along the longitudinal development of the channel 7, between the inlet opening 71 and the bottom 72.

Advantageously, in a possible embodiment (cf. FIGS. 1-4*a*, 4*b* and 4*c*), a single dust deposit channel 7 can be provided inside the inlet duct 25. Preferably, the dust deposit channel 7 is defined in correspondence with the inlet section 74 and, in particular, the inlet opening 71 of the channel 7 is defined in correspondence with the inlet end of the duct 25. Conveniently, the outlet opening 73 of channel 7 coincides with the inlet opening 71 of the channel itself. More in detail, in this embodiment, a dividing element 77 is provided in correspondence with the inlet section 74 which thus divides the lumen of the inlet section 74 into a dust deposit channel 7 and into a further passage 8. Preferably, the The dividing element 77 is a wall which extends along the diameter of the inlet section 74 of the inlet duct 25.

Therefore, the flow of gas entering the inlet duct 25 conveniently enters partly into the dust deposit channel 7 and into part enters directly/immediately in the further passage 8. Therefore, the dust present in the part of the gas flow entering the channel 7 accumulates on the bottom 72 of the channel itself and, furthermore, the trajectory of the gas flow entering the channel 7 is deflected—preferably substantially 180°—towards the inlet end of the inlet duct 25, to then re-enter the further passage 8.

Figure 5C:
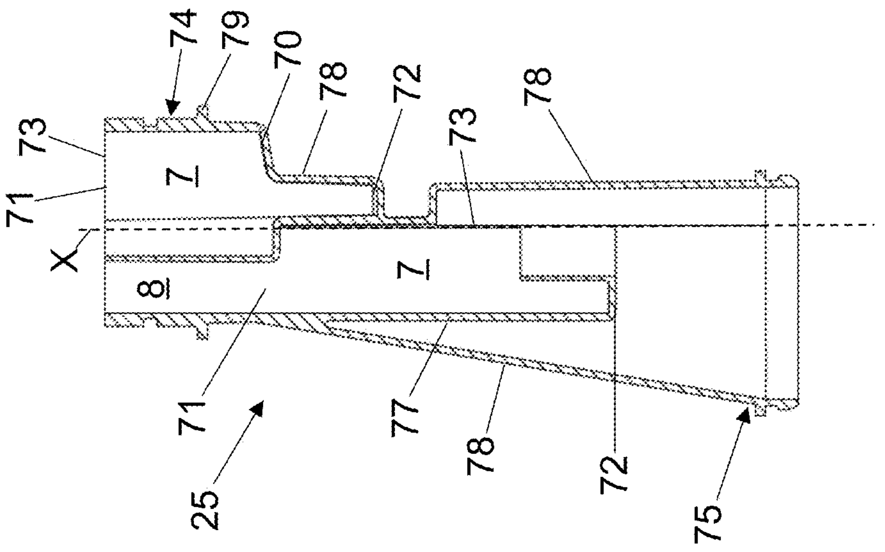
FIG. 5*c* shows a side view of a longitudinal section of the inlet duct of FIG. 5*a*.
Figure 5A:
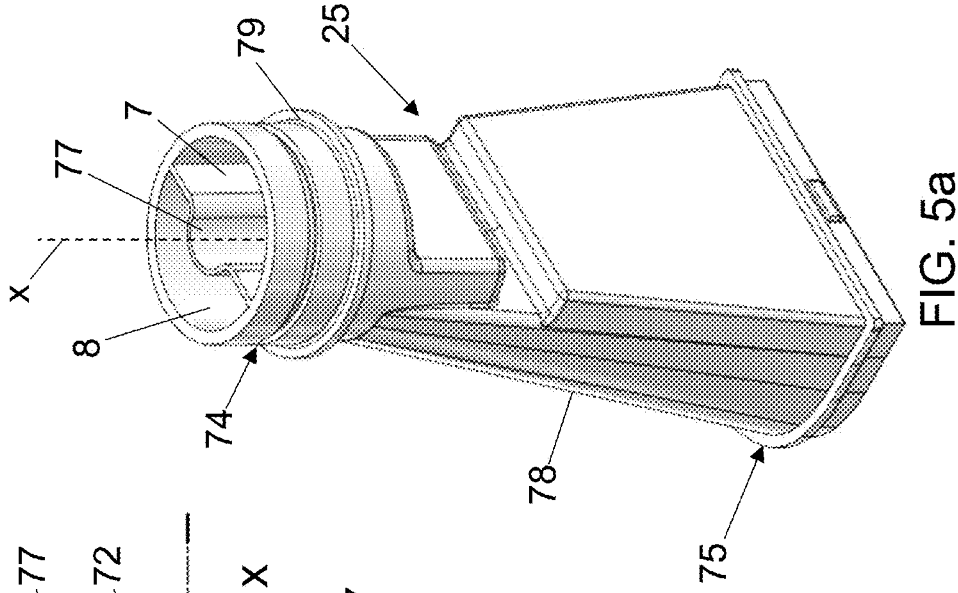
FIG. 5*a* shows a perspective view of a variant embodiment of the inlet duct.
Figure 5B:
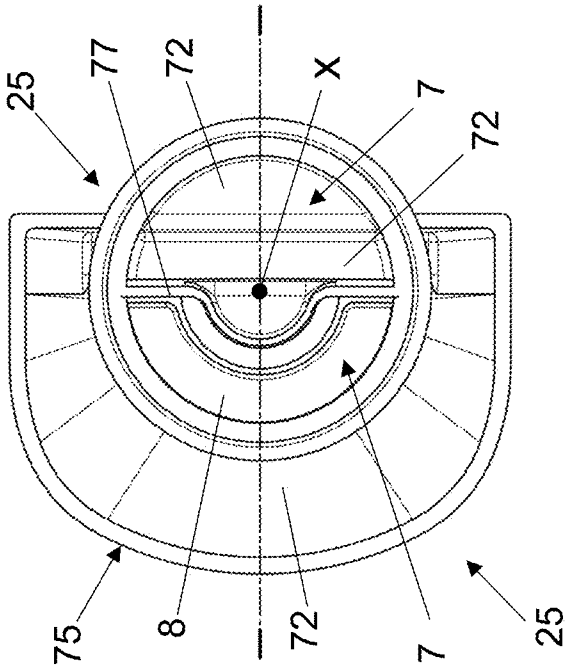
FIG. 5*b* shows a view from the other side of the inlet duct of FIG. 5*a*.
Figure 7:
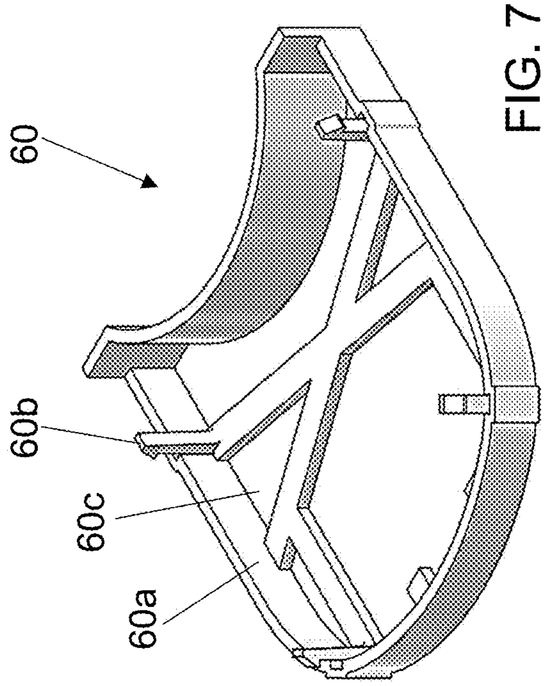
FIG. 7 shows in perspective view a lower frame to be associated with the separation element.
Figure 6:
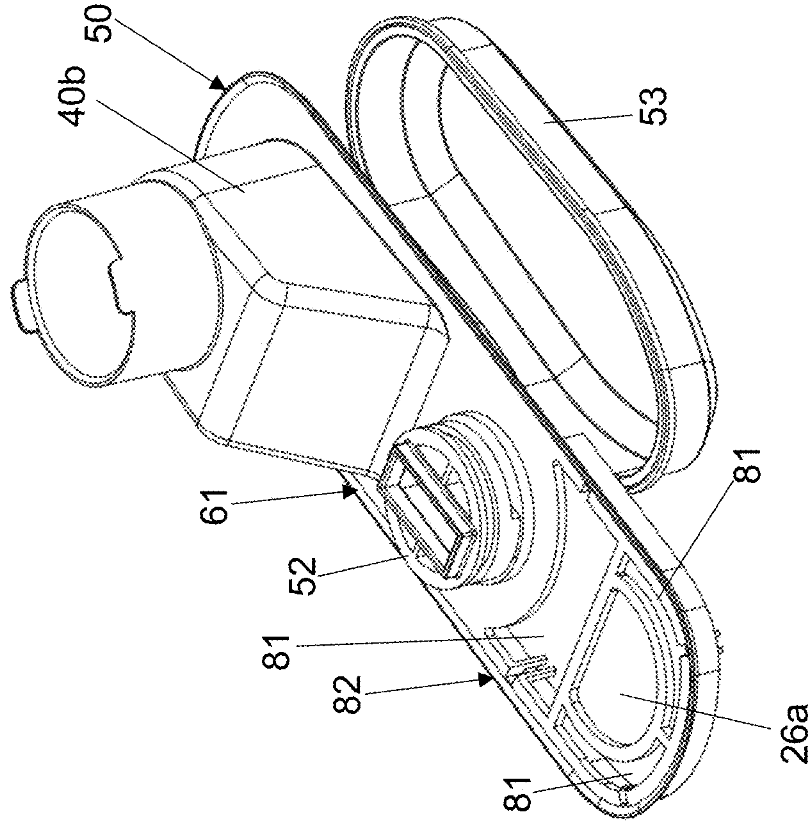
FIG. 6 shows in perspective view a separation element.
Figure 8:
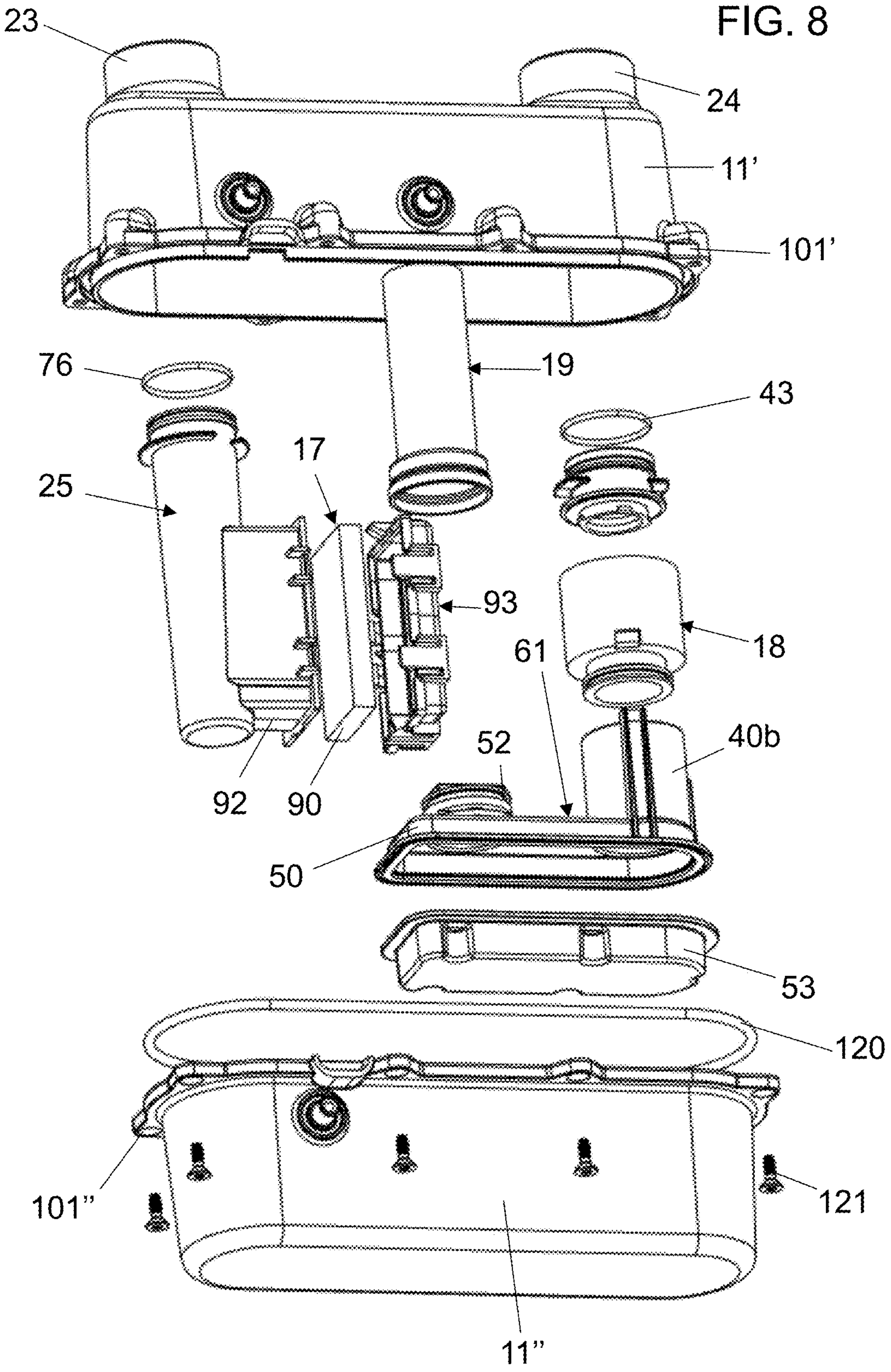
FIG. 8 shows a perspective exploded view of the gas meter according to a different embodiment.
Figure 9:
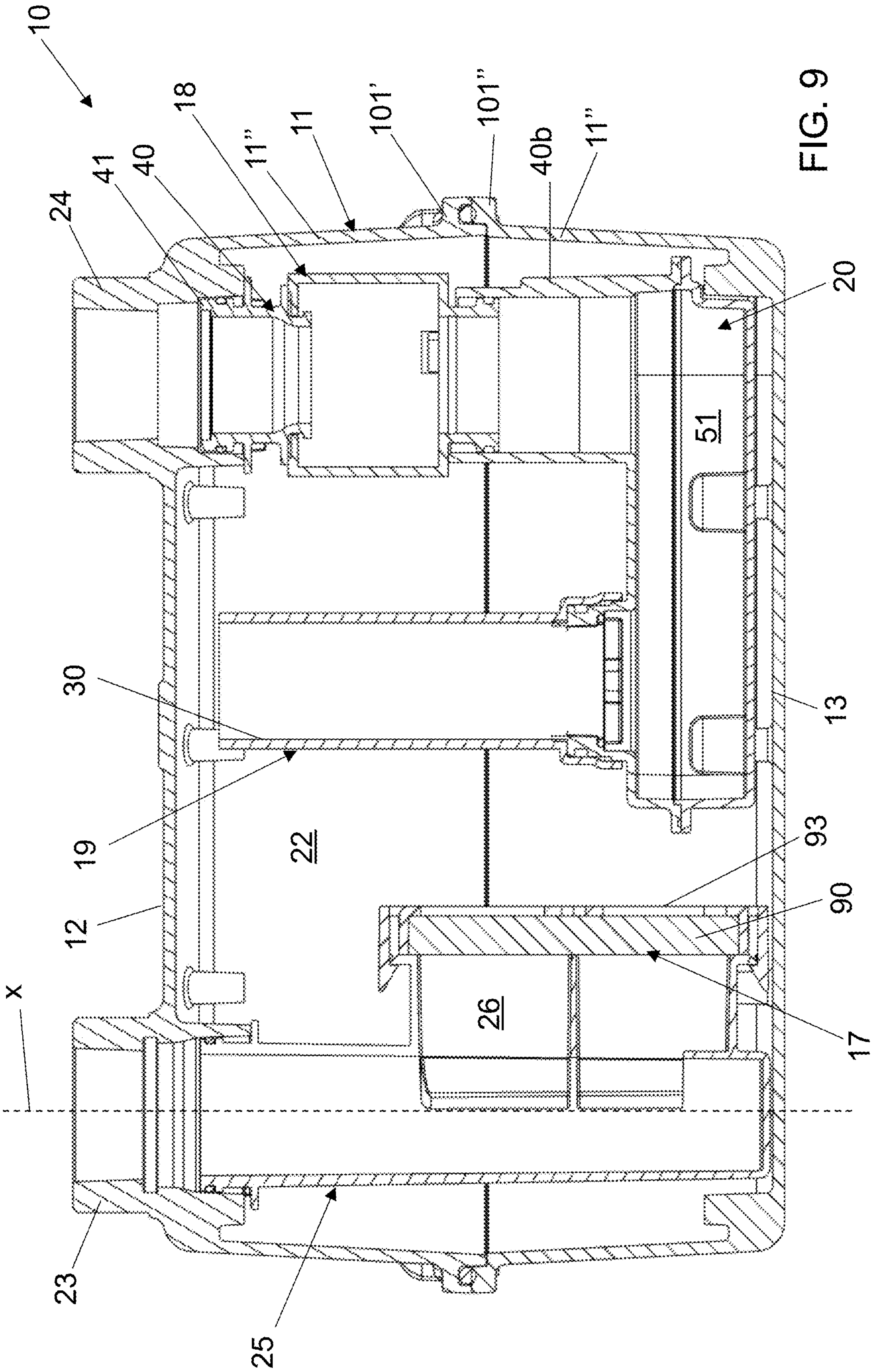
FIG. 9 shows a side view of a section of the meter of FIG. 8, FIG. 10
Figure 10:
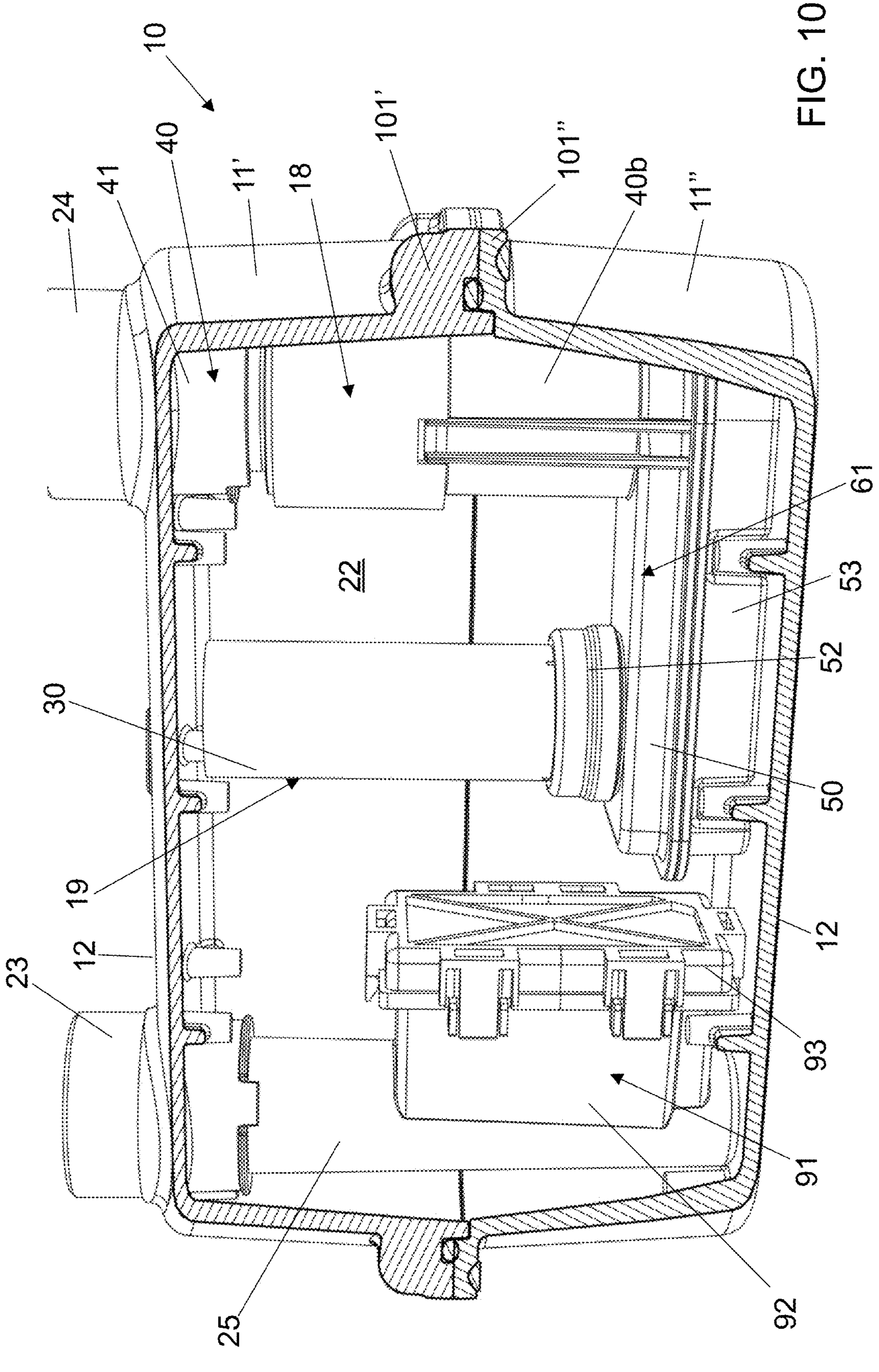
Figure 12:
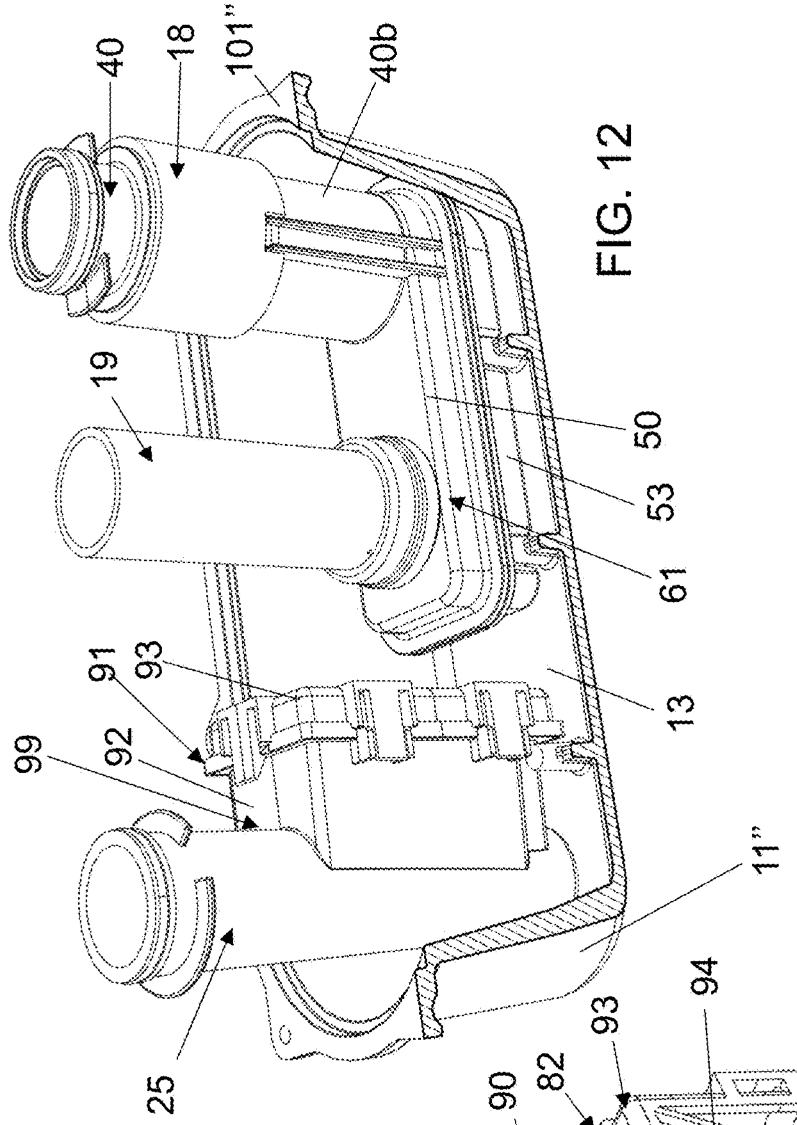
FIG. 12 shows the perspective section of the meter of FIG. 8 without a part of the containment structure.
Figure 11:
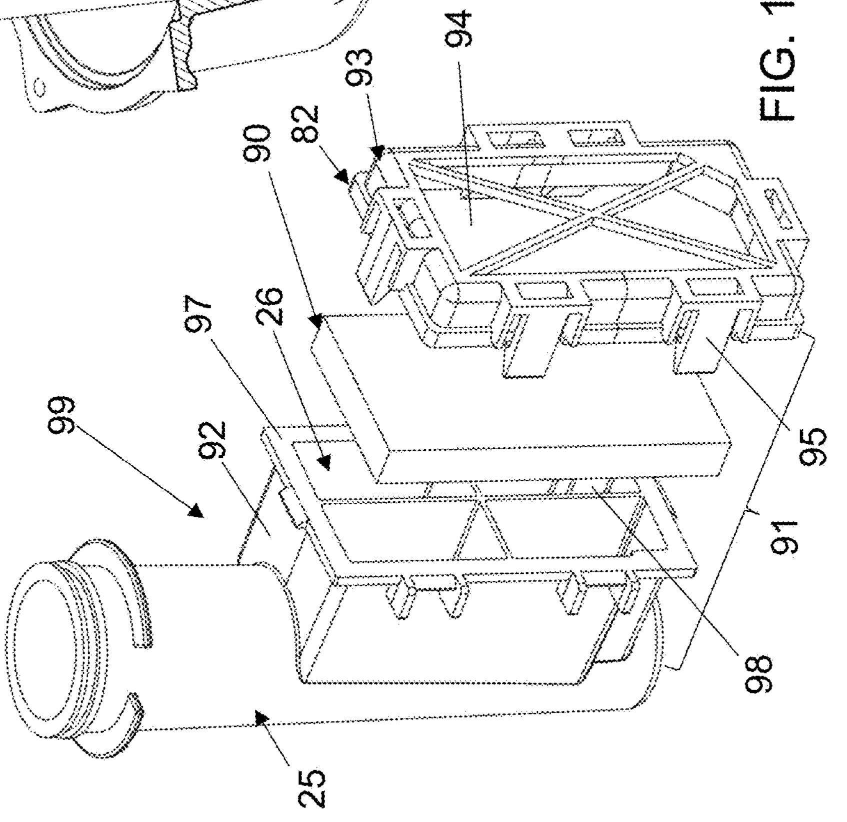
FIG. 11 shows a perspective section of the meter of FIG. 8.

Conveniently, said further passage 8 can define a straight and free path (i.e. without further deviations) towards the outlet section 75 (cf. FIGS. 1-4*a*, 4*b* and 4*c*, 10 and 11) or said further passage 8 can define a further channel 7 for depositing the powders (see FIGS. 5*a*, 5*b* and 5*c*). More in detail, in the latter case, the dust present in the part of the gas flow entering said further channel 7 accumulates on the corresponding bottom 72 of the channel itself and, moreover, the trajectory of the gas flow entering the channel 7 is diverted towards the outlet opening 73 which is formed laterally with respect to the bottom 72, to thus enter an area of the inlet duct 25 which is then in fluid communication (direct or through a powder deposit chamber 80) with the first zone 26.

Advantageously, therefore, in a possible embodiment, two or more dust deposit channels 7 can be defined inside the inlet duct 25. Conveniently, the dust deposit channels 7 cause one or more deviations of the gas flow that passes through the inlet duct 25, preferably thus forcing the gas flow—which is diverted from the blind/closed bottom 72 of each channel—to rise, at least in part, towards the direction of entry of the flow into the channel itself. Preferably, two or more dust deposit channels 7 can be provided inside the inlet duct 25 so that the flow of gas that crosses the duct crosses a path that is not linear and free, but has one or more bends and/or elbows.

In essence, therefore, the gas flow that crosses the inlet duct 25 enters—at least in part—inside the channel 7, defined inside the duct itself and, advantageously, the dust present in the gas flow is deposited and thus accumulate by gravity on the closed/blind bottom 72; moreover, the direction of the gas flow entering the channel 7, defined inside the inlet duct 25, is advantageously deviated from the closed/blind bottom 72, thus causing an initial accumulation of the dust present in the gas flow, entering the meter 10, in correspondence with an area which is far from/distanced from the measuring module 19.

Conveniently, in the embodiment shown here, the outlet section 75 of the inlet duct 25 opens fluidically directly inside the first zone 26 and, therefore, the gas dusts are deposited on the bottom wall 13 of the containment casing 11.

Advantageously, in a possible embodiment not shown here, the meter 10 also comprises a dust deposit chamber which is in fluidic communication with the inlet duct, in particular, is in fluid communication with the outlet section 75 of said duct. Conveniently, in one embodiment, the chamber is defined inside a cup-shaped body which is mechanically engaged. preferably by interlocking or snapping, to the outlet portion of the inlet duct 25, preferably so as to hang from the duct same. Advantageously, the cup-shaped body can be configured so that the chamber is closed at the bottom while in correspondence with its side walls it has filtering means, preferably a plurality of through openings configured to obstruct the passage of the powder Advantageously, therefore, the flow of gas which exits from the inlet duct 25 in a substantially vertical direction from top to bottom, enters the chamber provided in the first zone 26 and there its trajectory is diverted from the bottom of the chamber itself, towards the filtration means 17. Therefore, the flow of gas which then passes from the first zone 26 into the second zone 22 is forced to pass through the passages 81 comprising said filtration means 17.

Therefore, the gas flow that reaches the second zone 22 and then enters the detection module 19 is suitably filtered and cleaned of dust. In fact, a first stage for the removal of dust from the incoming gas is envisaged through each channel 7 with blind/closed bottom 72 provided inside the inlet duct 25, then a (possible) second deposition stage (by gravity) of the dust on the bottom of zone 26 or on the bottom of a dedicated chamber, and a further (third) stage of dust removal is also provided through the filtration means 17 provided/defined at the passages 81 between the first zone 26 and the second zone 22 which is in direct fluid communication with the detection module 19.

A detection module 19 of one or more parameters is housed inside the containment casing 11, preferably for determining the gas flow rate; also this detection module 19 has an inlet opening 19*a* and an outlet opening 19*b*.

A shut-off valve 18 for the flow of gas through the gas meter structure 10 can be housed inside the containment casing 11; this shut-off valve 18 having an inlet opening 18*a* and an outlet opening 18*b*.

The gas meter 10 also comprises an outlet duct 40, extending from the outlet 16 towards an opposite wall 13 of the containment casing 11.

Advantageously, the detection module 19 is positioned inside the second zone 22 between the inlet duct 25 and the outlet duct 40.

Advantageously, the shut-off valve 18 is mounted in correspondence with the outlet duct 40.

As said, in correspondence with the passages 81 between the first zone 26 (which is fluidic communication with the inlet duct 25) and the second zone 22 (which is in fluidic communication with the inlet of the detection module 19) filtration means 17 are provided. Conveniently, in a possible embodiment, the filtration means 17 are mounted/associated with a separation element 82 between the first zone 26 and the second zone 22.

In a possible and preferred embodiment, the separation element 82 is made of rigid plastic material, for example in polypropylene or similar materials.

Advantageously, the inlet duct 25, with its outlet section 75, passes through an hole 26*a* which is defined on the separation element 82. Preferably, in correspondence with the outlet section 75, the inlet duct 25 comprises a flange which is configured to abut the edges delimiting the hole 26*a*.

As mentioned, the first zone 26 is configured in such a way that the gas flow coming from the inlet duct can exit from said first zone 26 only by passing through the filtration means 17 mounted on the separation element 42.

Conveniently, the meter 10 it also comprises a support element 61 on which the detection module 19 is mounted. Conveniently, the outlet duct 40, on which the shut-off valve 18 is preferably mounted, is also mounted on the same support element 61 on which it is mounted the detection module 19.

In the embodiment of the invention described here, by way of non-limiting example of the invention, the support element 61 comprises a base portion 50, suitably shaped, which is positioned inside the containment casing element 11.

Preferably, in a possible embodiment in which the support element 61 also defines the separation element 82 between the two zones 26 and 22 (cf. FIG. 1-7), the base portion 50 is configured (in terms of shape and size) in imitation of the internal cross-sectional profile of the containment casing 11, i.e. so that the perimeter edges of this base portion 50 are arranged in proximity to or in contact with the internal surface of the containment casing 11.

Preferably, the base portion 50 comprises a perimeter flange 65 configured to be arranged and sealed at the junction area 100 between the two parts 11' and 11" which define the containment containment casing 11. In particular, the perimeter flange 65 is intended to rest and/or be clamped between the corresponding flanged edges 101' and 101" of the parts 11' and 11" respectively of the containment casing 11.

Advantageously, a tank 53 is also mounted on the base portion 50. Preferably, the base portion 50 is constituted by a single piece of rigid plastic material and the tank 53 is also constituted by ta from a single piece of rigid plastic material. Preferably, the edges of the tank 53 are sealed together, for example by thermal welding, or with other similar and equivalent sealing joining methods, to the base portion 50. Conveniently, the tank 53 is housed inside the first zone 26 while being fluidly separated from the latter.

Preferably, the base portion 50 and the tank 53 are made of rigid plastic material, for example of polypropylene or similar materials.

Conveniently, in a possible and preferred embodiment, the support element 61 is defined by and within the separation element 82 (see FIG. 1-7). Preferably, in this case, the base portion 50 comprises the support element 61 for mounting the detection module 19 and the outlet duct 40 and also, again on the base portion 50, the hole 26*a* is formed within the which engages the outlet section 75 of the inlet duct 25 and, moreover, comprises the filtration means 17 which are defined by a filter element 90 which is associated with the separation element itself. Conveniently, therefore, in this case, the detection module 19 is mounted on the separation element 82. Conveniently, the outlet duct 40 with the shut-off valve 18 is also mounted on the separation element.

In another possible embodiment (see FIG. 8-13), in which said separation element 82 is not provided between the two zones 26 and 22, the support element 61 is defined by a dedicated element which it only acts as a support for said detection module 19 and for the outlet duct 40.

Conveniently, the detection module 19 is connected tightly to the support element 61 and also the outlet duct 40 is connected tightly to the same support element 61.

As mentioned, the detection module 19 and the outlet duct 40, on which the shut-off valve 18 is preferably mounted, are conveniently placed side by side and parallel to each other.

Inside the containment casing 11 there are means 20 configured for the deviation of the flow of gas exiting from the outlet opening 19*b* of the detection module 19 towards the inlet opening 40*a* of the outlet duct 40.

Conveniently, the means 20 for diverting the flow comprise a tank 53 configured to define a "U" curvature of the gas flow leaving the detection module 19 to make it enter the outlet duct 40.

Advantageously, the tank 53 also defines a tank for the collection of any powders which have passed through the detection module and which thus settle on the bottom of the tank 53.

Conveniently, the tank 53 is associated with the support element 61 and, in particular, is tightly fixed to the support element 61 in correspondence with the face of the latter which is opposite to that in correspondence with which the detection module 19 and the outlet duct are connected. Advantageously, therefore, the detection module 19, the support element 61, the tank 53, the outlet duct 40—on which the shut-off valve 18 is preferably mounted—define a gas-tight unit which is fluidically inlet connected with the second zone 22 defined inside the casing 11 and at the outlet it is fluidically connected with an outlet pipe to the meter 11. Preferably, the terminal portion 41 of the outlet duct 40 is sealedly connected with the outlet port 16.

Conveniently, the terminal portion 41 of the outlet duct 40 is configured to engage in a proportional relationship within the outlet fitting 24. Advantageously, moreover, a gasket 43, preferably an O-ring, is mounted on the outer walls of the terminal portion 41, which is intended to be compressed by the internal walls of the outlet fitting 24 when the terminal portion 41 is inserted inside the fitting itself. Conveniently, for this purpose, a seat, for example a circumferential groove, and/or a circumferential flange, can be provided on the outer walls of the terminal portion 41 to keep the gasket 43 in position.

Conveniently, another gasket 44, preferably an O-ring, is also mounted on the outlet duct 40, for the sealing connection with the inlet portion 40*b*.

In more detail, moreover, the support element 61 comprises:

- a junction collar 52 for connection with the outlet opening 19*b* of the detection module 19, and
- the inlet portion 40*b* of the outlet duct 40.

Both the junction collar 52 and the inlet portion 40*b* are open and in fluid communication with the tank 53.

As mentioned, inside the containment casing 11 are means 20 are present configured for the deviation—preferably by an angle of 90°-180° and, even more preferably, by an angle of approximately 180°—of the gas flow leaving the outlet opening 19*b* of the detection module 19 towards the inlet 40*a* of the outlet duct 40.

Advantageously, the detection module 19 is positioned, as mentioned above, in the middle between the outlet duct 40 and the inlet duct 25, flanked both by the outlet duct 40 than to the inlet duct 25. In this intermediate position, and thanks to the means 20 for diverting the gas flow out of the outlet opening 19*b* of the detection module 19 towards the inlet opening of the outlet duct 40, the detection module 19 is substantially unreachable from any attempt at tampering that is carried out either through the outlet 16, or possibly through the inlet 15 of the containment casing 11. In fact, the presence on one side of the inlet duct 25 and of the separation element 82, on the other side of the shut-off valve 18 and of the flow diversion means 20, causes the detection module 19 to be substantially placed in the center of a labyrinthine path that cannot be traveled with the burglary instruments known today.

The detection module 19 is, for example, a static type flow detector. Preferably, the detection module 19 is of the ultrasonic type. Conveniently, the detection module 19 can be thermomassic.

This detection module 19 comprises a transit tube 30 for the flow of gas, of which the inlet 19*a* and outlet 19*b* openings are part, and inside which the actual sensors are present.

In a variant embodiment of the invention, the detection module 19 comprises an electronic unit 31 external to the transit tube 30. Conveniently, the electronic unit 31 is configured to power and control the sensors, to perform the reception of the detection signals emitted. from sensors and for the transmission of signals and/or data to an external control unit.

Conveniently, the longitudinal development direction of the transit tube 30 and of the outlet duct 40 are substantially parallel to the longitudinal development direction X of the inlet duct 25. Preferably, the detection module 19 is positioned with the inlet opening 19*a* which is in direct fluidic communication with the second zone 22 and which is located near the upper wall 12 of the containment casing 11.

Advantageously, the detection module 19 is positioned so that its electronic unit 31 is arranged beyond above the filter element 90; in this way, thanks to the specific position of the filter element 90 placed, on said flat portion, between the inlet hole 26*a* and the junction collar 52 for the connection of the detection module 19, the casing of the electronic unit 31 cooperates in the deviation of the gas flow and therefore in the filtration of the gas flow, since this casing of the electronic interface unit accumulates on its surface any residual dust present in the gas flow.

Conveniently, the separation element 82 is interposed between the bottom wall 13 and the inlet opening 19*a* of the detection module 19.

In the form of the invention described here, by way of non-limiting example of the invention itself, the means 20, configured for the deviation of the gas flow exiting from the outlet opening 19*b* of the detection module 19 towards the inlet opening 40*a* of the outlet duct 40, comprise the shaped body 50 inside which a diversion chamber 51.

The detection module 19, the means 20 for deviating the gas flow and the outlet duct 40, in correspondence with which the shut-off valve 18 is preferably mounted, are connected together so as to define a sealed path configured to prevent the gas flow already counted by the detection module 19 from escaping. Conveniently, the outlet opening 19*b* of the detection module 19 and the junction collar 52 of the shaped body 50 are tightly connected. Conveniently, the inlet portion 40*b* and the inlet of the shut-off valve 18 are connected tightly. Conveniently, the outlet of the shut-off valve 18 is sealedly connected to the outlet duct 40 which is then sealedly connected to the outlet fitting 24.

In a possible variant embodiment not shown, the shut-off valve 18 is not present or it could be mounted upstream of the inlet duct 25.

The filtration means 17 provided in correspondence with said at least one passage 81 between the first zone 26 and the second zone 22 are defined by a filter element 90 which is made of a different material compared to that with which the separation element 82 is made.

Conveniently, the filter element 90 defines a substantially flat or at most slightly curved filtering wall/septum, delimiting said first zone 26 and said second zone 22.

Preferably, the casing 11 internally comprises an intermediate chamber, fluidically interposed between the first zone 26 and the second zone 22, and in which it is housed—preferably to measure—the filter element 90. In accordance with the embodiment illustrated in the attached FIG. 2, the intermediate chamber is defined by the separation element 82 and the lower frame 60, when they are mechanically connected to each other in a removable way. In accordance with the embodiment illustrated in the attached FIG. 9, the intermediate chamber is defined inside the separation structure 91 and is defined by the frame 93 with the protruding body 92, when they are mechanically constrained to each other in a removable way. Advantageously, the filter element 90 housed in the intermediate chamber which mechanically and fluidically separates the first zone 26 from the second zone 22. Advantageously, moreover, the intermediate chamber houses the filter element 90 to size, preventing deformation of the latter as the temperature varies. pressure of the gas passing through it.

Conveniently, the filter element 90 is mounted so that the first zone 26 and the second zone 22 are separated from each other by and/or along the thickness S of the filter element itself.

Conveniently, the filter element 90 is a filter mat. Conveniently, the filter element 90 is shaped like a filter mat. Conveniently, the filter element is not of the pocket type, and in particular it is not shaped like a bag, envelope or bag with an open end.

Conveniently, each filter element 90 has a configuration in which the development along the thickness S is lower—in particular much lower—than that in the other two dimensions that define the surface extension of the filter. Conveniently, the shape and dimensions of the surface extension of the filter element 90 correspond and/or are slightly oversized with respect to the corresponding section of the passage 81 to be covered.

Conveniently, each filter element 90 has a stable and well-defined three-dimensional shape. Preferably, the filter element 90 is configured to have a surface extension that is flat or substantially flat.

Preferably, the filter element 90 is housed/positioned entirely, or in any case for the most part, inside—and in particular within the overall dimensions—of the separation means—for example defined by the separation element 82 with the lower frame 60, or from the protruding body 92 with the frame 93—on which the filter element 90 is mounted, thus optimizing its overall dimensions inside the casing 11.

Conveniently, each filter element 90 is configured so as to have a surface extension which is substantially flat and which is substantially coplanar or parallel, for its entire surface development, to the cross section of said at least one passage 81 in correspondence with which the filter element itself is installed.

Conveniently, each filter element 90 is configured and/or mounted in such a way as to have a thickness S which remains substantially constant along its entire surface extension.

Conveniently, each filter element 90 is configured and mounted so as to be and remain coplanar for its entire surface development.

Conveniently, in a possible embodiment (see FIGS. 1-7), the interior of the casing 11 is divided by the separation element 82 into a first zone 26 which is in fluid communication with the inlet duct 25 and in a second zone 22 which is in fluid communication with the detection module 19. The two zones 26 and 22 are in fluid communication with each other only in correspondence with one or more passages 81 which are completely covered and affected by a filter element 90 which is made of a material different from that of which said separation Preferably, the separation element 82 is made of rigid polymeric material, preferably polypropylene.

Conveniently, the filter element 90 is made of a fabric of polymeric fibers, preferably of a non-woven fabric of polymeric fibers, for example of heat-sealed elastic polyolefin fibers.

Preferably, the filter element 90 has a density of the fiber layers which increases from the inlet surface towards the outlet surface.

Preferably, the filter element 90 has a thickness S of about 5-25 mm.

Preferably, the filter element 90 has filtration class G2, G3 or G4 according to the classification of the CEN EN 779 standard.

Conveniently, the filter element 90 is mounted on the separation element 82 around the hole 26*a* in which the section 75 is inserted of the outlet duct 25. Preferably, the filter element has a through hole 90*a* for the insertion—at least in part—of the outlet section 75 of the outlet duct 25.

Preferably, the separation element 82 comprises a or more perforated portions, which thus define the passages 81, in correspondence with which one or more filter elements 90 are mounted so as to completely cover the passages themselves.

Preferably, the outlet section 75 of the inlet duct 25, which has passed through the hole 26*a* of the base portion 50, then engages by interference within the through hole 90*a* of the filter element 90.

Conveniently, the filter element 90 can be mounted on the separation element 82 and, preferably, is mounted on a folded edge of the base portion 50 which defines the separation element 82.

Advantageously, a lower frame 60 can be provided which is configured to mechanically engage in a removable manner, preferably interlocking or snap-on, on the separation element 82 (preferably on the base portion 50 of the separation element 82), below the filter element 90, to thus further support the latter. Preferably, the lower frame 60 allows a more stable and correct locking of the filter element 90 to the separation element 82. Preferably, the lower frame 60 comprises an internal grid zone 60*c* and an external frame 60*a* with elastic hooking fins 60*b* to the base portion 50 (see FIG. 7).

Conveniently, in a possible embodiment (see FIGS. 8-12), the separation means comprise a separation structure 91 which delimits said first zone 26 internally while said second zone 22 is defined outside said structure 91. Said at least one filter element 90 being mounted on said separation structure 91. Preferably, in this case, said at least one passage 81 comprising the filtering means 17 is defined in a separation structure 91 which is mounted, integrated and/or supported by the inlet duct 25 so that the interior of said structure is in direct fluid communication with the interior of the inlet duct 25. In particular, as said, the first zone 26 is defined within a separation structure 91, preferably box-shaped, which is mounted on or supported in a suspended condition by said inlet duct 25, preferably in correspondence with the central portion of the inlet duct 25. Conveniently, the first zone 26 defined inside the separation structure 91 is in direct fluid communication with the inlet duct 25 and is in fluid communication with the second zone 22 defined inside the casing 22, only by passing through the filter element 90 which is mounted on the separation structure 91, preferably inside the latter. Conveniently, also in this embodiment, the filtration means 17 are defined by said at least one filter element 90.

Conveniently, therefore, the assembly formed by the inlet duct 25 and the separation structure 91 with the filter element 90, thus define a filtration device 99.

More in detail, the separation structure 91 can comprise a protruding body 92, box-shaped, which is integrated on the inlet duct 25, preferably in correspondence with the central portion of said inlet duct 25. Conveniently, in this case, the end of the inlet duct 25 which is opposite to the inlet one has a blind/closed bottom. Conveniently, the interior of the protruding body 92 is in fluid communication with the inlet duct 25, is closed laterally and is open on a face delimited by an edge 97. Furthermore, the separation structure 91 comprises a frame 93 provided with through openings 94, entirely covered by the filter element 90, and by means 95, preferably snap-fit, to the protruding body 92. More in detail, in a possible embodiment of the frame 93, the latter comprises a frame 96 inside which the through openings 94 are defined and on which the hooking means 95 are provided, which are preferably defined by tabs for elastic attachment to the protruding edge 97 of the box-like body 91.

Preferably, the filter element 90 is mounted on the frame 93 and is held by the latter in such a way as to be kept resting on internal partitions 98 of the protruding body 92.

Conveniently, in this embodiment, the frame 93 on which the filter element 90 substantially acts as a separation element between the first zone 26 (which is defined within the separation structure 91 and in fluid communication with the inlet duct) and the second zone 22 (which is in fluid communication with the entrance of the detection module 19 and is defined by the space, which is external to the separation structure 91 and which is delimited by the internal walls of the casing 11).

Preferably, the protruding body 92 is formed in a single piece with the inlet duct 25.

Conveniently, the first zone 26 provided with the filter element 90 is associated with the inlet duct 25 above the bottom of the duct itself, to thus oblige the gas flow to rise, at least in part, in countercurrent. Preferably, for this purpose, the protruding body 92 is connected to the inlet duct 25 at a central portion of the latter.

Preferably, the inlet duct 25 is mounted inside the casing 25 so that its bottom comes into contact with the bottom wall 13 of the casing 11, or in any case is in proximity to the latter.

Preferably, one side of the separation structure 91 is in contact with the bottom wall 13, or in any case is in proximity to the latter.

Conveniently, the filter element 90 is arranged substantially parallel to the longitudinal development direction of the inlet duct 25 and, preferably, is perpendicular to the bottom wall 13 of the casing 11.

Advantageously, according to the invention, the filter element 90 is removably mounted on the respective elements or elements that support it, whether/these are defined by the separation element 82 and/or by the lower frame 60 and/or by the frame 93 and/or by the protruding body 92), thus allowing its removal and possible reuse after proper cleaning.

Conveniently, in the various embodiments, the filter element 90 is made of a different material with respect to the more rigid polymeric materials with which the mounting elements are made (ie the separation element 82 and/or the lower frame 60 and/or the frame 93 and/or the protruding body 92) which support it.

Preferably, at least two mounting elements are provided, which—in the examples illustrated and described—are defined by the separation element 82 with the lower frame 60 or by the frame 93 with the protruding body 92, configured so as to interact operatively with each other and also in such a way as to act in correspondence of at least a part of the opposite faces and/or edges of a corresponding filter element 90.

Preferably, in the various embodiments, the filter element 90 is held/clamped by two mounting elements, which are defined in the illustrated examples and described by the separation element 82 with the lower frame 60 or by the frame 93 with the protruding body 92 which interact operatively with each other so as to support the filter element 90 by acting in correspondence, of at least one part, of the opposite faces and/or edges of the filter element 90.

Advantageously, the two mounting elements—which are defined in the the examples illustrated and described by the separation element 82 with the lower frame 60 or by the frame 93 with the protruding body 92—can be configured in such a way as to hold and/or sandwich between them the filter element 90.

Advantageously, the two mounting elements—which are defined in the illustrated examples and described by the separation element 82 with the lower frame 60 or by the frame 93 with the protruding body 92—are configured to be releasably connected to each other, preferably by means of engagement mechanical interlocking and/or snap action.

Advantageously, the two mounting elements—which are defined in the illustrated examples and described by the separation element 82 with the lower frame 60 or by the frame 93 with the protruding body 92—can be configured to define a support structure for said filter element 90.

Advantageously, the two mounting elements—which are defined in the illustrated examples and described by the separation element 82 with the lower frame 60 or by the frame 93 with the protruding body 92—can be configured to define a support structure for said filter element 90 which, at least in part, is of a cage or lattice, for example in correspondence with the internal grid zone 60*c* of the lower frame 60 or in correspondence with the through openings 94 of the frame 93.

Conveniently, in a possible embodiment (cf. FIG. 8-12), the filter element 90 is arranged substantially parallel to the direction in which the gas flow passes through or the inlet duct 25.

Conveniently, in a possible embodiment (cf. FIG. 1-7), the filter element 90 is mounted substantially angled, and preferably perpendicularly, to the direction in which the gas flow through the inlet duct 25.

In practice it has been found that the invention achieves the intended aim and objects.

Unlike US2021231481, in the solution according to the present invention the filter element is a filter mat (thus allowing to obtain a higher filtering degree) and is positioned and/or retained—preferably in a removable way—between two mounting elements, forming part of the separation means between the first zone and the second zone, which are configured to be mechanically linked together in a removable way. This is particularly advantageous as it allows to obtain and maintain, in correspondence with the separation means, a stable positioning/holding of the mattress filter element (which allows a greater filtering of the dust present in the gas) and, at the same time, allows an assembly quick and safe during the meter production process. Furthermore, the removability of the filter mat inside the chamber defined between the two mounting elements that can be removably linked together allows advantageously to select the mat filter element with filtering capacity that is more suitable each time to the specific needs of the various applications. of use and/or required by sector regulations, as well as allowing easy removal and/or replacement of the mattress filter element when it is saturated, and this without also having to replace the separation means.

Advantageously, the meter according to the present invention thus conforms to the sector regulations, in particular, for example, it conforms to the European standard EN 14236: 2018.

Furthermore, advantageously, thanks to the channel or channels 7 defined inside the inlet duct 25 various channels for depositing the powders present in the incoming gas flow are defined, and this in addition to the filtration means 17 associated with the separation wall 82 Conveniently, in this way, the powders present in the gas flow are not transported by the main gas flow towards the detection module 19, much less towards the possible shut-off valve 18; in this way, the metrological and operating performance of the meter is guaranteed and constant over time.

The present invention has been illustrated and described in a preferred embodiment thereof, but it is understood that executive variations may be applied to it in practice, without however departing from the scope of protection of the present patent for industrial invention. The invention thus conceived is susceptible of numerous modifications and variations, all of which are within the scope of the inventive concept; moreover, all the details can be replaced by other technically equivalent elements. In practice, the components and materials employed, so long as they are compatible with the specific use, as well as the contingent shapes and dimensions, may be any according to requirements and to the state of the art. Where the characteristics and techniques mentioned in any claim are followed by reference signs, these reference signs are to be understood as affixed for the sole purpose of increasing the intelligibility of the claims and consequently such reference signs have no limiting effect on the interpretation. of each element identified by way of example by such reference signs.

The invention claimed is:

1. A gas meter, comprising:

a containment casing in which a gas inlet is defined inside the containment casing and an outlet for the exit of the gas from the containment casing, a detection module which is housed inside the containment casing and which is configured to detect one or more parameters relating to the gas entering the containment casing itself, a first zone and a second zone, both defined inside the casing, said first zone being in fluid communication with the inlet, said second zone being in fluid communication with an inlet of the detection module, the fluidic connection between said first zone and said second zone occurring exclusively through at least one passage comprising filtration means, said filtration means comprising at least one filter element which is mounted on separation means which separate said first and said second zone and wherein said filter element is made of material different from that with which said separation means are made, wherein said separation means comprise at least two mounting elements which are configured to be mechanically bonded to each other in a removable manner, said filter element is a filter mat which is positioned and/or retained, in a removable way, between said at least two mounting elements when they said at least two mounting elements are mechanically linked together and wherein:

the separation means comprise a separation element with a lower frame which is configured to mechanically engage in a removable way on the separation element;

said filter element is a filter mat which is retained, in a removable way, between the separation element and the lower frame;

the entire internal volume of the containment casing is divided into a first zone and a second zone by a separation element on which said filtration means are mounted and/or obtained;

the separation element is interposed between two opposite walls and of the containment casing;

the first zone and the second zone are superimposed and are separated from each other by a separation element on which at least one filter element is mounted;

the meter it also comprises a support element on which the detection module is mounted;

the support element is defined by and within the separation element;

the separation element is interposed between the bottom wall and an inlet opening of the detection module.

2. The gas meter according to claim 1, wherein said at least one filter element is housed/positioned mostly inside said separation means.

3. The gas meter according to claim 1, wherein said filter element is mounted on one of said mounting elements and is further supported and held in position by the other mounting element.

4. The gas meter according to claim 1, wherein said filter element is made of polymeric fiber fabric and wherein said separation means are made of rigid plastic material.

5. The gas meter according to claim 1, wherein said at least two mounting elements are configured so as to interact operatively with each other so as to define a constraint removable reversible connection and also in such a way as to act in correspondence with at least a part of the opposite faces and/or the edges of a corresponding element.

6. The gas meter according to claim 1, wherein said at least two mounting elements define, when they are mechanically linked together, an intermediate chamber in which the filter element is housed and which is fluidically interposed between the first zone and the second zone.

7. The gas meter according to claim 1, wherein said at least two mounting elements are configured in such a way as to hold and/or sandwich together said filter element.

8. The gas meter according to claim 1, wherein said at least two mounting elements are configured to define a support structure for said filter element.

9. The gas meter according to claim 1, wherein said at least two mounting elements are configured to define a support structure for said filter element which, at least in part, is a cage or lattice.

10. The gas meter according to claim 1, wherein said filter element is mounted on said separation means around an inlet duct which is housed inside the containment casing and which fluidically connects the inlet port with said first zone.

11. The gas meter according to claim 1, further comprising an inlet duct housed inside the containment casing and an opening for the entry of gas into at least one gas passage channel of the inlet duct, which faces at least one bottom thereof and an opening for the outlet of the gas from the at least one gas passage channel which faces or is aligned with the at least one bottom.

12. The gas meter according to claim 11, wherein the inlet duct comprises an inlet section, which fits tightly into an inlet fitting provided at the gas inlet, and an outlet section opposite the inlet section; and wherein, in correspondence with the inlet section of the inlet duct, the following is defined:

said at least one gas passage channel with said at least one bottom which is closed/blind so that the dust of the gas entering said channel settles, at least in part, on the at least one bottom of said at least one gas passage channel, and at least one further gas passage fluidically connected to the outlet section of the inlet duct.

13. The gas meter according to claim 12, wherein in said further gas passage at least one further gas passage channel is defined with at least one bottom which is closed/blind so that the dust of the gas entering said at least one further gas passage channel is deposited, at least in part, on the at least one bottom of said at least one further gas passage channel.

14. The gas meter according to claim 12, wherein a section of the outlet section of the inlet duct defines a larger passage area than a section of the inlet section of the duct itself and wherein the inlet duct has a substantially flared longitudinal development that goes from the inlet portion towards the outlet section.

15. The gas meter according to claim 1, wherein said two mounting elements are configured to be mechanically constrained to each other in a removable way by means of corresponding interlocking mechanical engagement means and/or snap.

16. A gas meter, comprising:

a containment casing in which a gas inlet is defined inside the containment casing and an outlet for the exit of the gas from the containment casing, a detection module which is housed inside the containment casing and which is configured to detect one or more parameters relating to the gas entering the containment casing itself, a first zone and a second zone, both defined inside the casing, said first zone being in fluid communication with the inlet, said second zone being in fluid communication with an inlet of the detection module, the fluidic connection between said first zone and said second zone occurring exclusively through at least one passage comprising filtration means, said filtration means comprising at least one filter element which is mounted on separation means which separate said first and said second zone and wherein that said filter element is made of material different from that with which said separation means are made, wherein said separation means comprise at least two mounting elements which are configured to be mechanically bonded to each other in a removable manner, said filter element is a filter mat which is positioned and/or retained, in a removable way, between said at least two mounting elements when said at least two mounting elements are mechanically linked together and wherein:

the first zone is in fluid communication with the inlet by means of an inlet duct, which is housed entirely inside the casing;

the inlet duct comprises an elongated body which is internally hollow to thus allow the gas to pass through;

an outlet duct is housed entirely inside the casing and extends from the outlet towards an opposite wall of the containment casing;

the detection module comprises a transit tube for the flow of gas and the longitudinal development direction of the transit tube and of the outlet duct are substantially parallel to the longitudinal development direction of the inlet duct;

inside the containment casing are housed means configured for the deviation by an angle of approximately 180° of the gas flow leaving an outlet opening 19*b* of the detection module towards an inlet opening of the outlet duct;

the detection module is positioned inside the second zone between the inlet duct and the outlet duct;

the filter element is arranged substantially parallel to the longitudinal development direction of the inlet duct and is perpendicular to the bottom wall of the casing.

17. The gas meter according to claim 16, wherein said separation means comprise a separation structure which delimits said first zone internally while said second zone is defined externally of said structure, said at least one filter element being mounted on said structure.

18. The gas meter according to claim 17, further comprising an inlet duct which is housed inside the containment casing and which is mechanically and fluidically connected to said inlet port, said separation structure is in fluid communication with said inlet duct and is hung/mounted on said inlet duct.

19. The gas meter according to claim 18, wherein said separation structure is in fluid communication with said inlet duct and is associated with a side wall of said inlet duct.

20. The gas meter according to claim 19, further comprising an inlet duct which is housed inside the containment casing and which is mechanically and fluidically connected to said inlet, and wherein the inlet duct comprises inside at least one gas passage channel with at least one bottom which is closed/blind so that dust of the gas entering said at least one gas passage channel are deposited, at least in part, on said at least one bottom of said at least one gas passage channel.

* * * * *